(12) United States Patent
Summers (10) Patent No.: US 7,006,333 B1
(45) Date of Patent: Feb. 28, 2006

(54) SUSPENSION WITH FLEXURE MOUNTED MICROACTUATOR

(75) Inventor: Robert Summers, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 412 days.

(21) Appl. No.: 10/186,045

(22) Filed: Jun. 27, 2002

Related U.S. Application Data (60) Provisional application No. 60/302,080, filed on Jun. 28, 2001.

(51) Int. Cl.
*G11B 5/56* (2006.01)
*G11B 21/24* (2006.01)

(52) U.S. Cl. .................. 360/294.4; 360/245.7
(58) Field of Classification Search ............. 360/294.4, 360/245.3, 245.4, 245.7, 245.9, 245; 310/311, 310/323.01
See application file for complete search history.

(56) References Cited

U.S. PATENT DOCUMENTS

| | | | | |
|---|---|---|---|---|
| 5,793,571 A | * | 8/1998 | Jurgenson et al. ....... | 29/603.25 |
| 6,078,476 A | * | 6/2000 | Magee et al. ............ | 360/294.3 |
| 6,118,637 A | * | 9/2000 | Wright et al. ............ | 360/294.4 |
| 6,266,212 B1 | * | 7/2001 | Coon ...................... | 360/234.5 |
| 6,376,964 B1 | * | 4/2002 | Young et al. ............. | 310/311 |
| 6,549,375 B1 | * | 4/2003 | Crane et al. ............. | 360/245.3 |
| 6,624,981 B1 | * | 9/2003 | Vigna ..................... | 360/294.3 |
| 6,757,137 B1 | * | 6/2004 | Mei ........................ | 360/245.7 |
| 2004/0125508 A1 | * | 7/2004 | Yang et al. .............. | 360/294.3 |
| 2004/0125510 A1 | * | 7/2004 | Yang et al. .............. | 360/294.4 |

FOREIGN PATENT DOCUMENTS

| | | | |
|---|---|---|---|
| JP | 63281212 A | * | 11/1988 |
| JP | 63291271 A | * | 11/1988 |
| JP | 03097174 A | * | 4/1991 |
| JP | 04265585 A | * | 9/1992 |

* cited by examiner

*Primary Examiner*—William J Klimowicz
(74) *Attorney, Agent, or Firm*—Louis J. Bachand (57) ABSTRACT

The invention provides a disk drive suspension. The suspension has a load beam and a flexure having a frame and a tongue portion having a base and a tongue. The flexure mounts one or more microactuators in opposed or offset relation for shifting the base of the flexure tongue portion relative to the flexure frame and thus positionally adjusting the tongue and the slider fixed to the tongue with respect to the disk that is in operating proximity to the slider.

33 Claims, 5 Drawing Sheets

SUSPENSION WITH FLEXURE MOUNTED MICROACTUATOR

RELATED APPLICATION

This application claims the benefit of U.S. Provisional Application Ser. No. 60/302,080, filed Jun. 28, 2001.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to disk drive suspensions that have one or more microactuators to shift slightly the slider that flies above the drive disk. In an important aspect the invention provides a mounting for electrodynamic microactuators, e.g. comprising piezoelectric crystals at the flexure rather than at the base portion/spring portion intersection of the load beam as has been the practice.

2. Description of the Related Art

Microactuators are electrodynamic devices that vary in size as a function of voltage input. Generally these devices comprise piezoelectric crystals; they have been mounted at the base portion/spring portion interface of a suspension for the purpose of slightly shifting the position of the suspension slider relative to the disk tracks, e.g. to compensate for small deviations in tracking from mechanical or environmental factors.

BRIEF SUMMARY OF THE INVENTION

It is an object of the invention to provide an improved microactuated disk drive suspension. It is a further object to place the microactuation function closer to the slider than it has been until now. A further object comprises placing one or more microactuators on the flexure portion of the suspension. A still further object is to provide a suspension in which the flexure frame extends in a first plane, there is a flexure tongue portion comprising a base and a tongue per se displaceably coupled to the surrounding frame with the tongue in a second plane spaced from the first plane, and the tongue is cantilevered from the frame via a spring connection between the tongue portion base and the tongue, including a hinge structure and/or a tether structure of one or more elongatable tethers. A still further object has the tongue so carried gimbal about a dimple carried at the distal end of the load beam beam portion. Other objects will appear hereinafter.

These and other objects of the invention to become apparent hereinafter are realized in a disk drive suspension comprising a beam portion and a flexure carried by the beam portion, the flexure comprising an interiorly open frame and a tongue portion supported by the frame, the tongue portion including a base and a tongue, the tongue being adapted to support a slider in operating proximity to a disk, and an electrodynamic microactuator fixed to the frame and to the tongue for shifting the tongue relative to the flexure frame, whereby the slider is shifted relative to the disk by the microactuator.

In a further embodiment, the invention provides a disk drive suspension comprising a beam portion and a flexure carried by the beam portion, the beam portion including a dimple, the flexure comprising an interiorly open frame and a tongue portion supported by the frame, the tongue portion including a base and a suspended or cantilevered tongue in gimballing relation with the dimple, the tongue being adapted to support a slider in operating proximity to a disk, and an electrodynamic microactuator fixed to the frame and to the tongue portion base for shifting the tongue relative to the flexure frame, whereby the slider is shifted relative to the disk by the microactuator.

In this and like embodiments, typically, the electrodynamic microactuator is a piezoelectric crystal, and there is further included a second microactuator, the second microactuator comprising a piezoelectric crystal, the electrodynamic microactuator is a first microactuator and located along the suspension longitudinal axis to the left of the dimple, and there is included also a second electrodynamic microactuator located along that axis and to the right of the dimple and fixed to the frame and to the tongue portion base in spaced relation to the first electrodynamic microactuator for shifting the tongue relative to the flexure frame in cooperation with the first electrodynamic microactuator, or the first and second electrodynamic microactuators are located one distally and one proximally of the dimple, or the electrodynamic microactuator is located to the left of the dimple, and including also a second electrodynamic microactuator located to the right of the dimple and fixed to the frame and to the tongue portion base in laterally spaced, opposed relation to the first microactuator for shifting the tongue relative to the flexure frame in cooperation with the first microactuator, or the first and second electrodynamic microactuators are located distally of the dimple, or the first and second electrodynamic microactuators are located proximally of the dimple.

Further, typically, the electrodynamic actuator comprises a piezoelectric crystal microactuator, the piezoelectric crystal microactuator being a first microactuator and located to the left of the dimple, and including also a second piezoelectric crystal microactuator located to the right of the dimple fixed to the frame and to the tongue portion base in spaced, offset relation to the first microactuator for shifting the tongue relative to the flexure frame in cooperation with the first microactuator, such as the first and second piezoelectric crystal microactuators being located one distally and one proximally of the dimple, the piezoelectric crystal microactuator being located to the left of the dimple, and a second piezoelectric crystal microactuator being located to the right of the dimple and fixed to the frame and to the tongue portion base in laterally spaced, opposed relation to the first microactuator for shifting the tongue relative to the flexure frame in cooperation with the first microactuator, or the first and second piezoelectric crystal microactuators are located distally or proximally of the dimple, and there can be a flexible circuit conductor extended along the suspension.

In a further embodiment, the invention provides a disk drive suspension comprising a beam portion and a flexure carried by the beam portion, the flexure comprising an interiorly open frame in a first plane adjacent to the beam portion, and a tongue portion having a base disposed generally in a second plane and flexibly coupled to the frame, and a tongue, the tongue being disposed in a second plane parallel to the first plane, the tongue being connected via the tongue portion base to the frame in suspended, e.g. cantilevered relation, the tongue being adapted to support a slider in operating proximity to a disk, and an electrodynamic microactuator having a first portion fixed to the frame and a second portion fixed to the tongue base portion, the microactuator being arranged to shift the tongue relative to the flexure frame, whereby the slider is shifted relative to the disk.

In this and like embodiments, typically, the suspension has left and right sides and a dimple intermediate the sides, the first microactuator being disposed on the suspension left side and the second microactuator being disposed on the suspension right side spaced from the first microactuator, the first and second microactuators being relatively offset along the longitudinal axis of the flexure frame to be distal and proximate of the dimple respectively, or the first and second microactuators are opposed along the longitudinal axis of the flexure frame and proximate of the dimple, or the first and second microactuators are relatively offset along the longitudinal axis of the flexure frame and distal to the dimple, there is also a slider carried by the flexure tongue, and a flexible circuit conductor is extended along the suspension and coupled to the slider.

In a still further embodiment, the invention provides a disk drive suspension comprising a load beam having a beam portion, a flexure carried by the beam portion, and a dimple at the distal end of the beam portion, the flexure comprising a frame extending in a first plane adjacent to the beam portion, the frame having an open interior, and a tongue portion comprising a base and tongue generally spaced above the open interior and extending substantially in a second plane, a tether coupling the tongue to the frame, the tongue being in gimballing contact with the dimple, the tongue supporting a slider adapted to fly in operating proximity to a disk, and an electrodynamic microactuator having a first portion fixed to the frame and a second portion fixed to the tongue, the microactuator acting to shifting the tongue relative to the flexure frame, whereby the slider is shifted relative to the disk.

In this and like embodiments, typically, the invention also includes a plurality of tethers coupling the tongue to the frame, the microactuator is a first microactuator, and there is also included a second microactuator having first and second portions fixed to the frame and to the tongue respectively and in spaced relation to the first microactuator, the first and second microactuators acting cooperatively to shift the tongue relative to the flexure frame, the suspension has left and right sides, the first microactuator being disposed on the suspension left side and the second microactuator being disposed on the suspension right side spaced from and opposed to the first microactuator, or the first microactuator is disposed on the suspension left side and proximate to the dimple, the second microactuator being disposed on the suspension right side distal to the dimple and spaced from and offset relative to the first microactuator along the longitudinal axis of the frame, and there is a flexible circuit conductor extended along the suspension and coupled to the slider.

In its method aspects, the invention provides a method of shifting a suspension flexure tongue relative to a frame on which the tongue is supported, including fixing one portion of a microactuator to the frame, fixing a second spaced portion of the microactuator to the tongue, and actuating the microactuator to shift the tongue relative to the frame.

In this and like embodiments, typically, the microactuator is a first microactuator, and there is included also fixing one portion of a second microactuator onto the frame in spaced relation from the first microactuator one portion, fixing a second portion of the second microactuator onto the tongue in spaced relation from the first microactuator second portion, and cooperatively actuating the first and second microactuators to shift the tongue relative to the frame, maintaining the first and second microactuators in opposed relation across the tongue portion, or maintaining the first and second microactuators in offset opposed relation, and supporting the tongue relative to the frame by an elongatable tether.

BRIEF DESCRIPTION OF THE SEVERAL VIEWS OF THE DRAWINGS

The invention will be further described in conjunction with the attached drawings in which.

DETAILED DESCRIPTION OF THE INVENTION

The invention has a number over advantages over previously known microactuated suspensions that while using one or more piezoelectric crystals for microactuation do so at a distance from the distal end of the suspension by acting at spring portion of the suspension and applying force between the suspension base and beam portions, see U.S. Pat. No. 5,898,544, for example. Locating the microactuators at the distal end of the suspension and acting on the flexure tongue reduces the amount of stroke required of the microactuator making smaller actuators suitable, requires less voltage to activate, simplifies manufacture, reduces stress in the spring area that is being used for gram loading, and avoids the adverse effects on resonance characteristic of the previous efforts at suspension microactuation. Further, in accordance with the invention, the HGA (head gimbal assembly) manufacturer can combine attachment of the microactuators (PZT crystals) with attachment of the read/write heads (sliders) for a cost savings, a greater PZT stroke can be obtained with the same voltage or the same stroke with less voltage, there is no adverse effect on resonance properties or gram load, and electrical connection of the PZT is easier.

With reference now to the drawings in detail, In FIGS. 1 to 9 the invention disk drive suspension is shown at 10 and comprises a load beam 11 having a base 111, a spring portion 112, a beam portion 12 and a flexure 14 carried by the beam portion. Flexure 14 comprises an interiorly open frame 16 and a tongue portion 18 supported by the frame. Dimple 82 bears on the flexure tongue 24 in the conventional manner so that the tongue gimbals about the dimple accommodating the movements of slider 26. Tongue portion 18 includes a base 22 and a cantilevered tongue per se 24. Tongue 24 supports slider 26 in operating proximity to the disk indicated at 28. Piezoelectric crystal microactuators 32 arranged distally and proximally along the beam portion longitudinal axis A—A are fixed at their respective outer portions 34, 36 to longitudinal legs 38, 42 of the frame 16 and at their inner portions 44, 46 to the tongue portion base 22 or tongue 24. Thus attached, microactuators 32 will shift the tongue 24 left and right relative to the beam portion 12 axis A—A, and relative to the flexure frame 16, such that the slider 26 is shifted relative to the disk 28.

Figure 1:
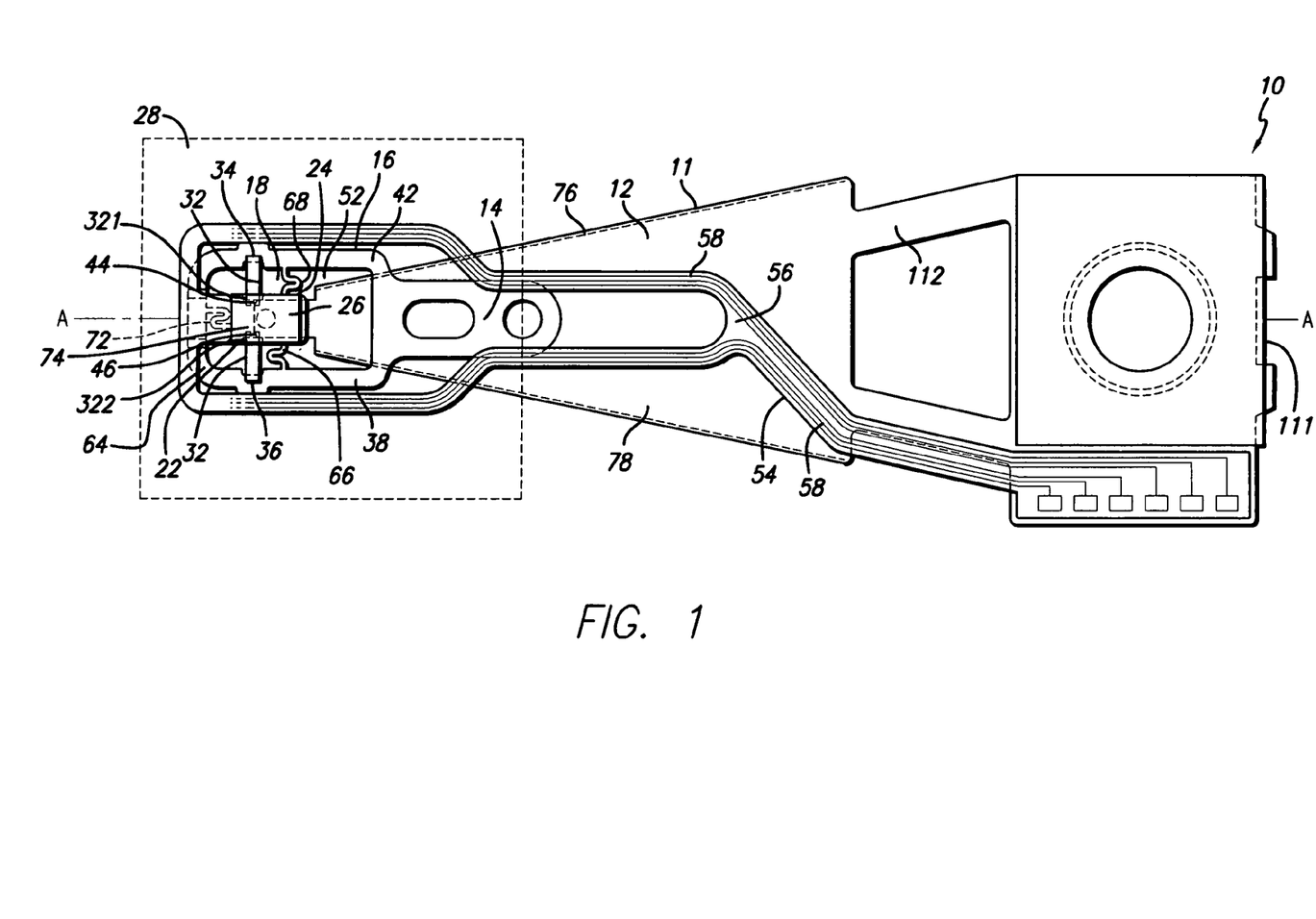
FIG. 1 is a plan view of the invention suspension in a first embodiment.

The piezoelectric crystal microactuator 32 includes a first microactuator 321, and a second piezoelectric crystal microactuator 322, both fixed to the frame 16 and to the tongue 24 or tongue portion base 22, as shown, for shifting the tongue 24 relative to the flexure frame in cooperation with each other. In a first embodiment, first microactuator 321, and second microactuator are fixed to the frame 16 and to the tongue portion base 22 in laterally spaced relation and opposed to each other across the frame opening 52. Tongue 24 is above the frame opening 52 but within the vertical plane of the frame and will move vertically in that vertical plane. In this embodiment, the microactuators 321, 322 are both distal to the dimple 82.

Figure 2:
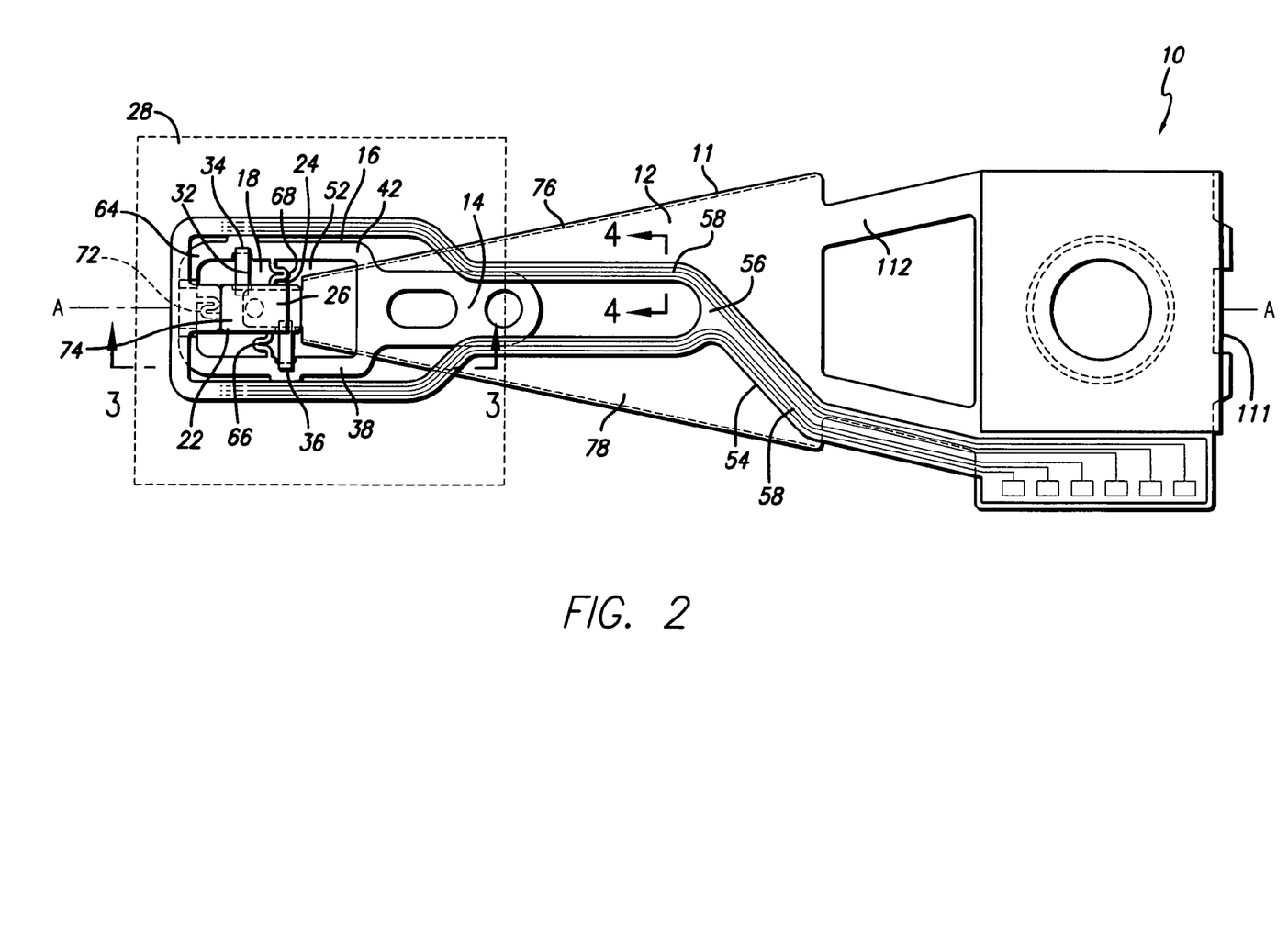
FIG. 2 is a plan view of the invention suspension in a further embodiment.

In a second embodiment, shown in FIG. 2, the first and second microactuators 321, 322 are offset and not directly opposed. This embodiment, which may be easier to manufacture, has the first and second microactuators 321, 322 fixed to the frame 16 and to the tongue 24 or tongue portion base 22 in laterally spaced, longitudinally offset relation of the first microactuator to the second microactuator. Thus arranged, the microactuators 321, 322 are one distal and one proximate to the dimple 82; they act in concert to shift the tongue 24 relative to the flexure frame 16 in cooperation with each other.

In the first and second embodiments a flexible circuit conductor 54 comprising a laminate of an insulative plastic film 56 and trace conductors 58 and optionally a metal layer 62 (FIG. 4) is extended along the suspension beam portion 12 and thence around the flexure frame 16, as shown.

With further reference to FIGS. 1–3 and 5–9 flexure frame 16 extends in a first plane, P1—P1. Tongue portion base 22 and tongue per se 24 are disposed generally in a second plane P2—P2 supported by spring connector 74 which can be a fold of metal continued from the frame cross-member 64, as shown. While the thusly hinged tongue portion base 22 can support the tongue 24 in cantilevered relation, it is preferred to provide as well flexible coupling to the frame as limiters if not the sole support of the tongue 24. Thus, the tongue base 22 and/or tongue 24 are flexibly coupled to the frame longitudinal legs 38, 42, and distal cross member 64 by serpentine or otherwise elongatable or extensible tethers 66, 68 and 72. These tethers 66, 68 and 72 which can be used singly or in pairs or groups as shown but are typically symmetrical relative to the tongue are integrally formed with the flexure frame 16 and tongue 24 and shaped to elongate or contract in response to movement of the tongue portion 18, although the metal of which they are typically made is substantially inextensible.

Tongue 24 is disposed in a second plane P2—P2 parallel to the first plane P1—P1, and connected via the tongue portion base 22 or tether 72 to the frame 16 to extend in the second plane in cantilevered or tethered relation. Tongue base 22 and tongue 24, as noted, are connected by the spring connection 74 that is a continuation of the base and the tongue portion bent to form a hinge between the frame and tongue.

Figure 3:
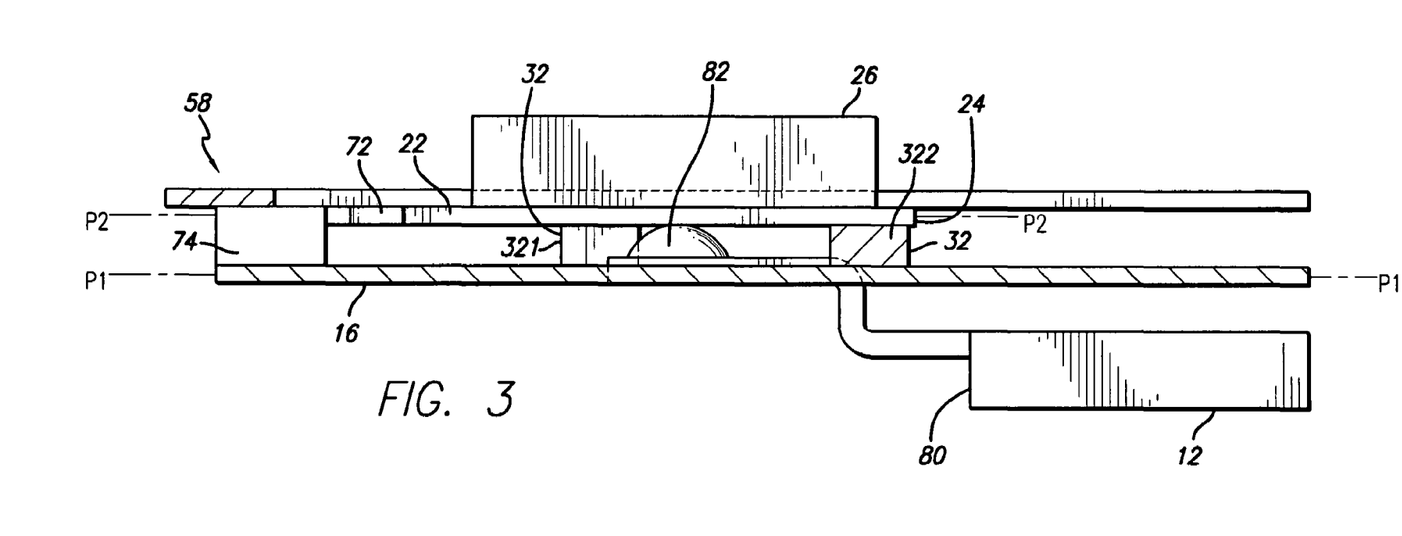
FIG. 3 is a side elevation view, partly in section, of the FIG. 2 embodiment.
Figure 4:
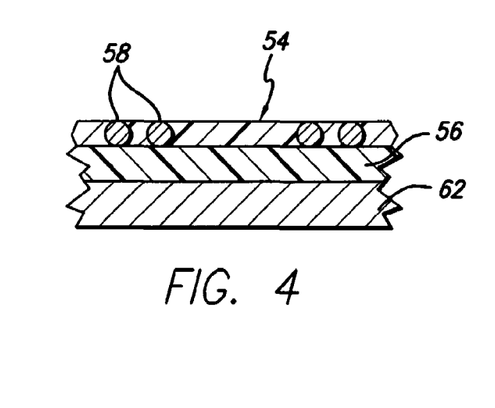
FIG. 4 is a fragmentary detail view of the invention flexible circuit taken on line 4—4 in FIG. 2.
Figure 4A:
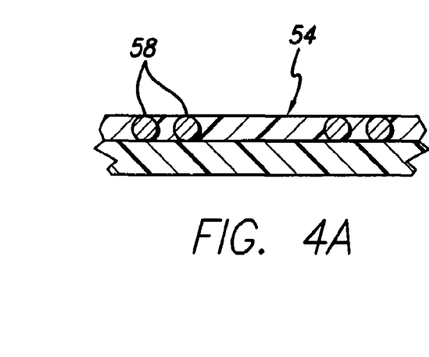
FIG. 4A is a view like FIG. 4 of a modified form of the invention flexible circuit.
Figure 5:
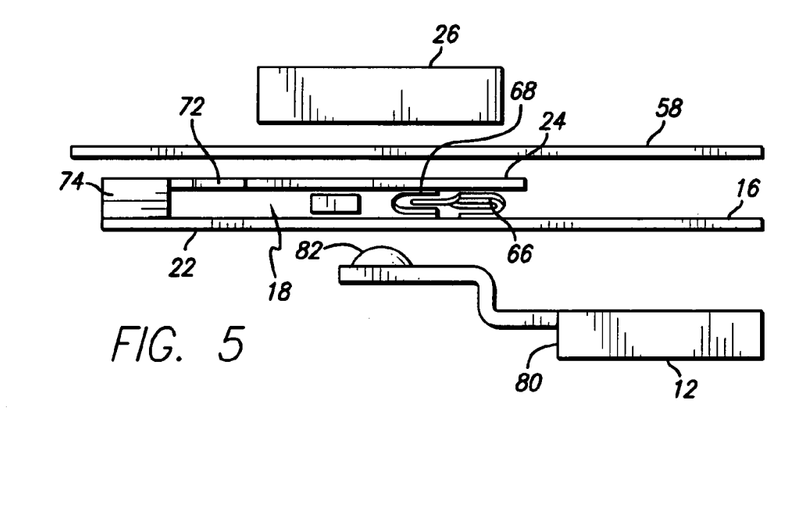
FIG. 5 is an exploded side elevation view, partly in section, of the FIG. 1 embodiment.
Figure 6:
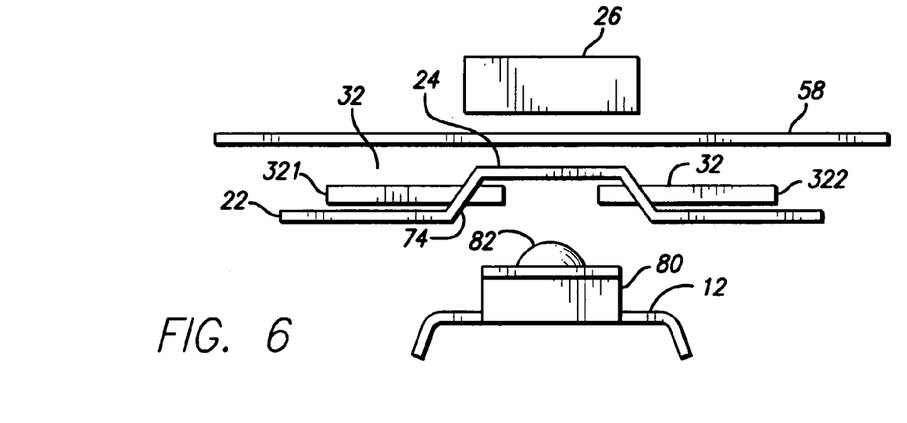
FIG. 6 is an exploded front elevation view thereof.
Figure 7:
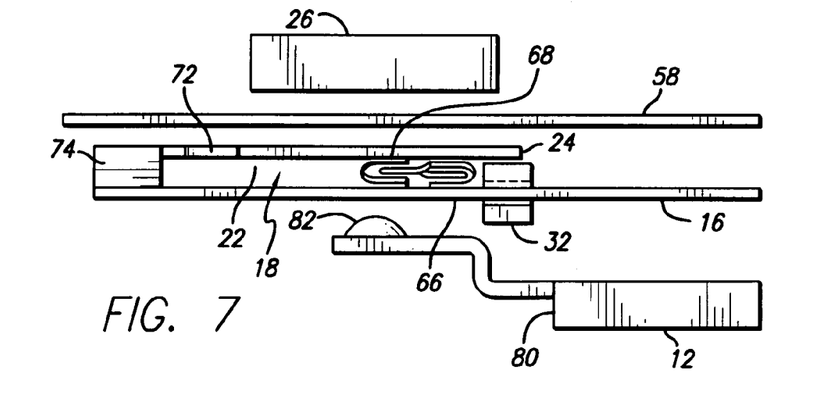
FIG. 7 is an exploded side elevation view of a further embodiment.
Figure 8:
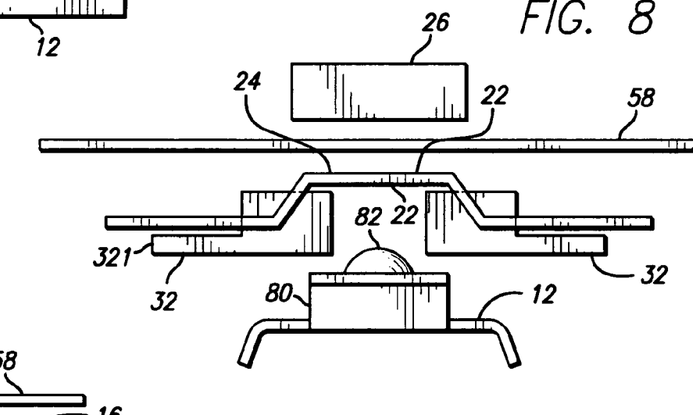
FIG. 8 is an exploded front elevation view thereof.
Figure 9:
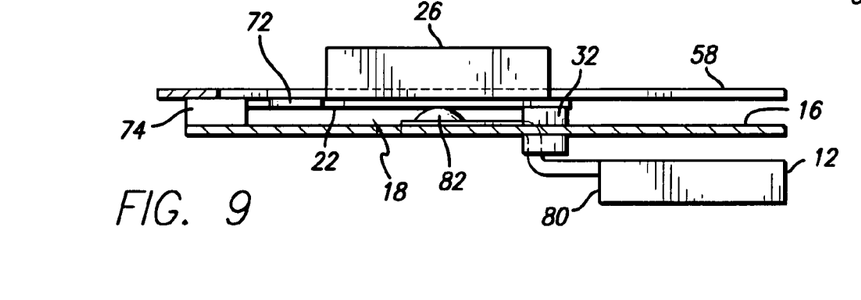
FIG. 9 is an assembled side elevation view thereof.

Suspension beam portion 12 has left and right sides 76, 78. First microactuator 321 is disposed on the suspension left side 76 and the second microactuator 322 is disposed on the suspension right side 78 spaced from and opposed to the first microactuator with both being distal of the dimple 88 (FIGS. 1, 5, and 6), or both proximate of the dimple 82 (FIGS. 7, 8 and 9), or spaced and relatively offset along the longitudinal axis A—A (FIGS. 2, 3).

Beam portion 12 defines at its distal end the dimple 82 to extend through the flexure frame opening 52 for tongue 24 to gimbal about in the conventional manner. The tongue supports the slider 26 to fly in operating proximity to disk 28.

In the invention method, suspension flexure tongue portion 18 comprising a base 22 and a tongue 24 is shifted relative to frame 16 on which the base is supported, by fixing one portion of a microactuator 321 to the frame, outer portion 34, fixing a second spaced portion, inner portion 46, of the microactuator onto the base, and actuating the microactuator to shift the tongue relative to the frame. Where there are two microactuators, 321, 322, the method includes fixing one portion, outer portion 36, of microactuator 322 onto the frame in spaced relation from the first microactuator outer portion 34, fixing a second portion, inner portion 46, of the second microactuator onto the tongue portion base 22 in spaced relation from the first microactuator second portion, inner portion 44, and cooperatively actuating the first and second microactuators to shift the tongue relative to the frame. As previously indicated, the first and second microactuators 321, 322 can be maintained in opposed relation across the tongue portion base 22, see FIG. 1, or maintained in offset opposed relation, as shown in FIGS. 2 and 3.

The invention method of shifts the suspension flexure tongue 24 relative to the frame 16 on which the tongue is supported, by one portion 34 of microactuator 321 to the frame, fixing a second spaced portion 44 of the microactuator to the tongue, and actuating the microactuator to shift the tongue relative to the frame. Using a second microactuator 322, one portion 36 of the second microactuator is fixed to the frame 16 in spaced relation from the first microactuator, and a second portion 46 of the second microactuator is fixed to the tongue in spaced relation from the first microactuator. The microactuators 321, 322 are cooperatively actuated to shift the tongue relative to the frame 16. As shown above, the first and second microactuators can be mounted in opposed relation across the tongue portion distal to the dimple 82, or proximate to the dimple, or in offset opposed relation bracketing the dimple, and supporting the tongue relative to the frame by an elongatable tether 66, 68 and/or 72 in tongue and slider movement limiting relation.

The invention thus provides an improved microactuated disk drive suspension that places the microactuation function closer to the slider by placing one or more microactuators on the flexure portion of the suspension where the flexure frame extends in a first plane, there is a flexure tongue portion comprising a base and a tongue per se loosely coupled to the surrounding frame with the tongue in a second plane spaced from the first plane, and the tongue is cantilevered from the frame via a spring connection between the tongue portion base and the tongue, the tongue being carried to gimbal about a dimple carried at the distal end of the load beam beam portion suitably in tethered relation.

The foregoing objects are thus met.

I claim:

1. A disk drive suspension having a suspension longitudinal axis and comprising a beam portion and a flexure carried by the beam portion, the flexure comprising an interiorly open frame and a tongue portion supported by the frame, the tongue portion including a base and a tongue, the tongue being adapted to support a slider in operating proximity to a disk, and an electrodynamic microactuator having a longitudinal axis, said microactuator being disposed with its said longitudinal axis normal to said suspension longitudinal axis and fixed to the frame and to the tongue for shifting the tongue left and right relative to the suspension longitudinal axis and the flexure frame, whereby the slider is shifted relative to the disk by the microactuator.

2. A disk drive suspension having a suspension longitudinal axis and comprising a beam portion and a flexure carried by the beam portion, the beam portion including a dimple, the flexure comprising an interiorly open frame and a tongue portion supported by the frame, the tongue portion including a base and a cantilevered tongue in gimballing relation with the dimple, the tongue being adapted to support a slider in operating proximity to a disk, and an electrodynamic microactuator having a longitudinal axis extending transversely to said suspension longitudinal axis, said microactuator being fixed to the frame and to the tongue portion base for shifting the tongue relative to the flexure frame, whereby the slider is shifted relative to the disk by the microactuator.

3. The disk drive suspension according to claim 2, in which the electrodynamic microactuator is a piezoelectric crystal.

4. The disk drive suspension according to claim 2, including also a second microactuator, the second microactuator comprising a piezoelectric crystal.

5. The disk drive suspension according to claim 2, in which the electrodynamic microactuator is a first microactuator and located along the suspension longitudinal axis to the left of the dimple, and including also a second electrodynamic microactuator having a longitudinal axis located along and normal to said suspension longitudinal axis to the right of the dimple and fixed to the frame and to the tongue portion base in transversely opposed and spaced relation to the first electrodynamic microactuator for shifting the tongue relative to the flexure frame in cooperation with the first electrodynamic microactuator.

6. The disk drive suspension according to claim 5, in which the first and second electrodynamic microactuators are located one distally and one proximally of the dimple.

7. The disk drive suspension according to claim 2, in which the electrodynamic microactuator is located to the left of the dimple, and including also a second electrodynamic microactuator having a longitudinal axis normal to said suspension longitudinal axis, said second microactuator being located to the right of the dimple and fixed to the frame and to the tongue portion base in laterally spaced, opposed relation to the first microactuator for shifting the tongue relative to the flexure frame in cooperation with the first microactuator.

8. The disk drive suspension according to claim 7, in which the first and second electrodynamic microactuators are located distally of the dimple.

9. The disk drive suspension according to claim 7, in which the first and second electrodynamic microactuators are located proximally of the dimple.

10. The disk drive suspension according to claim 2, in which the electrodynamic actuator comprises a piezoelectric crystal microactuator, the piezoelectric crystal microactuator being a first microactuator and located along the longitudinal axis of said suspension and to the left of the dimple, and including also a second piezoelectric crystal microactuator having a longitudinal axis normal to said suspension longitudinal axis and located along said axis to the right of the dimple fixed to the frame and to the tongue portion base in spaced relation to the first microactuator for shifting the tongue relative to the flexure frame in cooperation with the first microactuator.

11. The disk drive suspension according to claim 10, in which the first and second piezoelectric crystal microactuators are located one distally and one proximally of the dimple.

12. The disk drive suspension according to claim 10, in which the second piezoelectric crystal microactuator is in laterally spaced, opposed relation to the first microactuator for shifting the tongue relative to the flexure frame in cooperation with the first microactuator.

13. The disk drive suspension according to claim 12, in which the first and second piezoelectric crystal microactuators are located distally of the dimple.

14. The disk drive suspension according to claim 10, in which the first and second electrodynamic microactuators are located proximally of the dimple.

15. The disk drive suspension according to claim 2, including also a flexible circuit conductor extended along the suspension.

16. A disk drive suspension having a suspension longitudinal axis and comprising a beam portion and a flexure carried by the beam portion, the flexure comprising an interiorly open frame in a first plane adjacent to the beam portion, and a tongue portion having a base disposed generally in a second plane and flexibly coupled to the frame, and a tongue, the tongue being disposed parallel to the first plane, the tongue being connected via the tongue portion base to the frame in cantilevered relation, the tongue being adapted to support a slider in operating proximity to a disk, and an electrodynamic microactuator having a longitudinal axis and a first portion fixed to the frame and a second portion fixed to the tongue portion base, the microactuator being disposed with its said longitudinal axis normal to said suspension longitudinal axis and arranged to shift the tongue relative to the flexure frame, whereby the slider is shifted relative to the disk.

17. The disk drive suspension according to claim 16, in which the microactuator is a first microactuator, and including also a second electrodynamic microactuator having a longitudinal axis normal to the suspension longitudinal axis and having first and second portions fixed to the frame and to the tongue portion base respectively and in spaced relation to the first microactuator, the first and second microactuators acting cooperatively to shift the tongue relative to the flexure frame.

18. The disk drive suspension according to claim 17, in which the suspension has left and right sides, the first microactuator being disposed on the suspension left side and the second microactuator being disposed on the suspension right side spaced from and opposed to the first microactuator.

19. The disk drive suspension according to claim 18, in which the suspension has left and right sides and a dimple intermediate the sides, the first microactuator being disposed on the suspension left side and the second microactuator being disposed on the suspension right side spaced from the first microactuator, the first and second microactuators being relatively offset along the longitudinal axis of the flexure frame to be distal and proximate of the dimple respectively.

20. The disk drive suspension according to claim 18, in which the suspension has left and right sides and a dimple intermediate the sides, the first microactuator being disposed on the suspension left side and the second microactuator being disposed on the suspension right side spaced from the first microactuator, the first and second microactuators being opposed along the longitudinal axis of the flexure frame and proximate of the dimple.

21. The disk drive suspension according to claim 18, in which the suspension has left and right sides and a dimple intermediate the sides, the first microactuator being disposed on the suspension left side and the second microactuator being disposed on the suspension right side spaced from the first microactuator, the first and second microactuators being distal to the dimple.

22. The disk drive suspension according to claim 16, including also a slider carried by the flexure tongue, and a flexible circuit conductor extended along the suspension and coupled to the slider.

23. A disk drive suspension having a suspension longitudinal axis and comprising a load beam having a beam portion, a flexure carried by the beam portion, and a dimple at the distal end of the beam portion, the flexure comprising a frame extending in a first plane adjacent to the beam portion, the frame having an open interior, and a tongue portion comprising a base and tongue generally within the open interior and extending substantially in a second plane, a tether folded on itself to be extensible elongatably and contractably coupling the tongue to the frame, the tongue being in gimballing contact with the dimple, the tongue supporting a slider adapted to fly in operating proximity to a disk, and an electrodynamic microactuator having a longitudinal axis normal to said suspension longitudinal axis and a first portion fixed to the frame and a second portion fixed to the tongue, the microactuator acting to shifting the tongue left and right relative to said suspension longitudinal axis and the flexure frame, whereby the slider is shifted relative to the disk.

24. The disk drive suspension according to claim 23, including also a plurality of said tethers elongatably and contractably coupling the tongue to the frame.

25. The disk drive suspension according to claim 23, in which the microactuator is a first microactuator, and including also a second microactuator having a longitudinal axis disposed normal to said suspension longitudinal axis and first and second portions fixed to the frame and to the tongue respectively and in spaced relation to the first microactuator, the first and second microactuators acting cooperatively to shift the tongue relative to the suspension longitudinal axis and the flexure frame.

26. The disk drive suspension according to claim 25, in which the suspension has left and right sides, the first microactuator being disposed on the suspension left side and the second microactuator being disposed on the suspension right side spaced from and opposed to the first microactuator.

27. The disk drive suspension according to claim 25, in which the suspension has left and right sides, the first microactuator being disposed on the suspension left side and proximate to the dimple, the second microactuator being disposed on the suspension right side distal to the dimple and spaced from and offset relative to the first microactuator along the longitudinal axis of the frame.

28. The disk drive suspension according to claim 23, including also a flexible circuit conductor extended along the suspension and coupled to the slider.

29. A method of shifting a suspension flexure tongue having a longitudinal axis relative to a frame on which the tongue is supported, including disposing a microactuator with its longitudinal axis normal to the tongue longitudinal axis, fixing one portion of a microactuator to the frame, fixing a second spaced portion of the microactuator to the tongue, and actuating the microactuator to shift the tongue relative to the frame.

30. The method according to claim 29, the microactuator being a first microactuator, including also disposing a second microactuator with its longitudinal axis normal to said tongue longitudinal axis, fixing one portion of the second microactuator onto the frame, fixing a second portion of the second microactuator onto the tongue, and cooperatively actuating the first and second microactuators to shift the tongue relative to the frame.

31. The method according to claim 30, including also maintaining the first and second microactuators in opposed relation across the tongue portion.

32. The method according to claim 30, including also maintaining the first and second microactuators in offset opposed relation.

33. The method according to claim 29 including also supporting said tongue relative to the frame by an elongatable tether.

* * * * *